United States Patent
Cane' et al.

(10) Patent No.: US 12,508,359 B2
(45) Date of Patent: Dec. 30, 2025

(54) PORTABLE PUMP FOR DRUG INFUSION THROUGH A SYRINGE REMOVABLY ENGAGED IN THE PUMP

(71) Applicant: CANE' S.P.A., Rivoli (IT)

(72) Inventors: Claudio Cane', Rivoli (IT); Mario Cane', Rivoli (IT); Paolo Cane', Rivoli (IT)

(73) Assignee: CANE' S.P.A., Rivoli (IT)

( * ) Notice: Subject to any disclaimer, the term of this patent is extended or adjusted under 35 U.S.C. 154(b) by 754 days.

(21) Appl. No.: 17/417,419

(22) PCT Filed: Dec. 24, 2019

(86) PCT No.: PCT/IB2019/061334
§ 371 (c)(1),
(2) Date: Jun. 23, 2021

(87) PCT Pub. No.: WO2020/141411
PCT Pub. Date: Jul. 9, 2020

(65) Prior Publication Data
US 2022/0080113 A1    Mar. 17, 2022

(30) Foreign Application Priority Data
Dec. 31, 2018 (IT) .................. 102018000021484

(51) Int. Cl.
*A61M 5/142* (2006.01)
*A61M 5/145* (2006.01)
*A61M 5/315* (2006.01)

(52) U.S. Cl.
CPC .... *A61M 5/14236* (2013.01); *A61M 5/14546* (2013.01); *A61M 5/31501* (2013.01);
(Continued)

(58) Field of Classification Search
CPC ................................................. A61M 5/14236
See application file for complete search history.

(56) References Cited

U.S. PATENT DOCUMENTS

| 5,269,762 A | 12/1993 | Armbruster et al. |
| 6,447,487 B1 | 9/2002 | Cane' |

(Continued)

FOREIGN PATENT DOCUMENTS

| EP | 2174679 A1 | 4/2010 |
| EP | 2394682 A1 * | 12/2011 ........ A61M 5/14566 |

(Continued)

OTHER PUBLICATIONS

International Search Report and Written Opinion of the International Searching Authority issued for International PCT Application No. PCT/IB2019/061334 on Feb. 28, 2020.

*Primary Examiner* — Courtney B Fredrickson
*Assistant Examiner* — Kayla M. Turkowski
(74) *Attorney, Agent, or Firm* — Howson & Howson LLP

(57) ABSTRACT

Portable pump (11) for drug infusion through a syringe (SR) removably engaged in the pump, said pump comprising an electromechanical unit (13) having a rod (15) which is longitudinally slidable within a guide member (17) and capable of exerting an axial thrust onto the plunger (SF) of the syringe engaged in the pump, wherein said rod (15) and said guide member (17) have a non-circular cross-section, whereby rotation of the rod (15) relative to the guide member (17) is prevented.

14 Claims, 9 Drawing Sheets

(52) U.S. Cl.
CPC ............... *A61M 5/31513* (2013.01); *A61M 2005/14506* (2013.01)

(56) References Cited

U.S. PATENT DOCUMENTS

| | | | |
|---|---|---|---|
| D565,176 | S | 3/2008 | Cane' |
| D659,234 | S | 5/2012 | Cane' |
| 8,172,814 | B2 | 5/2012 | Cane' |
| 9,220,835 | B2 | 12/2015 | Cane' |
| 9,289,549 | B2 | 3/2016 | Cane' |
| 9,463,271 | B2 | 10/2016 | Cane' |
| 10,406,283 | B2 | 9/2019 | Cane' et al. |
| 2003/0009133 | A1 | 1/2003 | Ramey |
| 2003/0130618 | A1 | 7/2003 | Gray et al. |
| 2009/0093792 | A1 | 4/2009 | Gross et al. |
| 2010/0249706 | A1* | 9/2010 | Clemente .......... A61M 5/14566 604/154 |
| 2011/0210147 | A1 | 9/2011 | Fago |
| 2014/0142499 | A1* | 5/2014 | Moberg .............. A61M 5/1452 604/67 |
| 2014/0303560 | A1 | 10/2014 | Yates et al. |
| 2017/0056579 | A1* | 3/2017 | Müri ................. A61M 5/14546 |
| 2017/0266385 | A1* | 9/2017 | Farris ................ A61M 5/31528 |
| 2018/0117240 | A1* | 5/2018 | Archilla ............. A61M 5/3271 |
| 2018/0169326 | A1* | 6/2018 | Fago .................. A61M 5/1418 |
| 2018/0185584 | A1 | 7/2018 | Cowe et al. |
| 2019/0209772 | A1 | 7/2019 | Cane' et al. |
| 2020/0016328 | A1 | 1/2020 | Cane' et al. |
| 2020/0046899 | A1 | 2/2020 | Cane' et al. |
| 2021/0386935 | A1* | 12/2021 | Ueki ................. A61M 5/1458 |

FOREIGN PATENT DOCUMENTS

| | | | |
|---|---|---|---|
| EP | 3515534 B1 * | 1/2023 | ............ A61M 5/142 |
| WO | WO-02083209 A1 * | 10/2002 | .......... A61M 5/1456 |

* cited by examiner

PORTABLE PUMP FOR DRUG INFUSION THROUGH A SYRINGE REMOVABLY ENGAGED IN THE PUMP

TECHNICAL FIELD

The present invention relates to a portable pump for drug infusion through a syringe removably engaged in the pump. The invention falls within the field of electromedical apparatus, intended for the infusion of drugs in liquid form into the body of a living being. More particularly, the invention relates to an electromechanical pump for drug infusion, of the portable type, i.e. which can be "worn" by a patient, for example by means of a suitable case or pouch or the like.

Background Art

Electromechanical pumps for infusing drugs in liquid form are known in the field of electromedical apparatus. The infusion of the drug takes place through a syringe that is mechanically connected to the pump and hydraulically connected to a living being. The hydraulic connection is usually effected through a cannula and a needle implanted in the body of a living being.

An example of a known electromechanical pump for drug infusion is described in EP 2 174 679 A1. The operation of this type of equipment is based on mechanical parts that transform the rotational motion of an electric gear motor into the translational motion of a pusher intended to exert an adequate thrust against the plunger of the syringe connected to the apparatus. The transformation of the motion from rotational to translational is generally carried out by means of a screw/nut coupling. The latter receives the motion from the electric geared motor through a pair of gears. A torque primary gear, or torque drive gear, is fixed to the driving shaft of the electric geared motor, while a secondary gear, or driven gear, is fixed around the nut. A position transducer, or optical encoder, is typically provided to establish the angular position of the driving shaft and transmit it to an electronic controller that governs the operation of the pump and controls the feed rate of the pusher and, consequently, the amount of drug delivered through the syringe in the time unit.

A drawback of the known electromechanical pumps is determined by the construction complexity of the unit transforming rotational motion of the electric geared motor into translational motion of the pusher. The construction complexity results in high production costs. Moreover, the measures adopted so far to obtain the above-mentioned motion transformation, having to guarantee the optimal operation of the pump for a long time, must comply with high quality standards and are consequently further expensive to implement.

A first object of the invention is to solve the prior art drawbacks by providing a portable pump for drug infusion through a syringe removably engaged in the pump which is simple and can be produced in a cost-effective manner.

A further drawback of known portable infusion pumps is their excessive weight. As is well known, the main components of the pump that determine its weight are the geared motor, the mechanical parts for the transmission of motion, the casing and the battery that powers the electric geared motor. Since these infusion pumps are especially intended to be worn by an individual, it is clear that the lighter they are, the more they will be appreciated by users.

Another object of the present invention is therefore to provide a pump for drug infusion which is lightweight and therefore easily portable.

Another drawback of known pumps is the noise caused by the mechanical transmission. As pumps are often worn by individuals in the course of normal activity, noise can be a particularly annoying and undesirable factor and can impair the spread of this type of pump among patients.

A further object of the invention is to provide a pump of the above type which is quieter and smoother in the operation of mechanical parts than known electromechanical infusion apparatus.

A further object of the invention is to provide a pump that lends itself to being made in a compact and portable format, i.e. that can be easily worn by the user, even in those situations where noise during operation could be annoying.

Another object of the invention is to create a portable pump for drug infusion which has a high hydraulic sealing capacity and can therefore be worn by users even in damp environments, such as during normal body care and washing activities.

A last but not least object of the invention is to provide a device for drug infusion, which is simple and inexpensive to implement and is therefore suitable for large-scale industrial production.

These and other objects are achieved with a portable pump for drug infusion as claimed in the appended claims.

SUMMARY OF THE INVENTION

The portable pump for drug infusion according to the invention mainly comprises an electromechanical unit for causing exit of a drug from a syringe removably engaged in the pump. The electromechanical unit of the pump is provided with a rod longitudinally slidable within a guide member and capable of exerting an axial trust onto the plunger of the syringe engaged in the pump. Advantageously, according to the invention, in order to prevent rotation of the rod relative to the guide member during longitudinal sliding, the rod and the guide member have a non-circular cross-section.

Preferably, according to the invention, the cross-section of the rod and the cross-section of the guide member are complementary to each other. Even more preferably, a minimum clearance is provided between the slidable rod and the guide member, so as to allow axial sliding of the rod without jamming, but also to prevent oscillations of the rod relative to the guide member.

Preferably, the cross-section of the rod and of the guide member is oval or elliptical, but, still according to the invention, other geometrical shapes are possible, preferably comprising at least one curved portion and at least one rectilinear portion, such as, for example, "C"-like or "D"-like shapes.

The rod with non-circular cross-section will also be preferably and advantageously oriented so as to minimize the distance between said rod and the other parts of the pump, thus advantageously making use of the non-circular cross-section of the rod in order to reduce the overall size of the pump.

In a particular embodiment, the slidable rod advantageously has an oval or elliptical cross-section, or a cross-section comprising a substantially rectangular or square cross-section and a pair of rounded peripheral portions. The rod comprises an axial cavity having at least one open base and adapted to receive a rotatable screw actuated by an electric geared motor belonging to said electromechanical unit. The rotatable screw is engaged with the corresponding thread of an internally threaded nut or bushing housed within said cavity, preferably at said open base. Preferably, said nut or bushing is co-molded with or press-fitted in the open base of the longitudinally slidable hollow rod.

According to a preferred embodiment of the invention, the electromechanical unit further comprises an electric geared motor having a driving shaft provided with a pinion, which, with its teeth, engages into a toothed gear wheel fixed to the base of said screw. The electric geared motor is adapted to cause, through coupling between the pinion and the toothed gear wheel, rotation of the screw in both directions, depending on the direction of rotation of the electric geared motor, and consequent sliding back and forth of the hollow rod.

The pump according to the invention further comprises a casing defining therein a chamber housing the electromechanical unit. Still according to the invention, the casing is preferably made of a plastic material, for example by means of an injection molding process, and said guide member is molded during forming of said casing and thus forms a single piece with said casing.

Preferably, the casing of the pump is entirely made of a plastic material and has a substantially annular development with at least one of the opposite bases open to allow access to the chamber that houses the electromechanical unit. Even more preferably, the casing of the pump has a rectangular annular development.

Still according to a preferred embodiment of the invention, said casing further comprises, externally, a ferrule capable of receiving, in a configuration of firm engagement, the base of a syringe for drug infusion. Preferably, said ferrule defines a corresponding bayonet-like coupling for the syringe having radially extending and diametrically opposite wings. According to this arrangement, said ferrule includes a pair of opposite arched seats and a pair of diametrically opposite slits, whereby the syringe with its respective wings can be engaged into the pump by a coupling movement substantially comprising an axial approaching movement and a subsequent rotation about the axis of the syringe. In other embodiments, the ferrule may define other types of coupling for the base of a syringe of a different kind, for example of a syringe having a screw or complementary coupling provided inside or outside the syringe body.

The guide member extends longitudinally preferably outside the casing of the pump. In other embodiments, however, it can also be envisaged that the guide extends inside the casing or both inside and outside said casing.

Preferably, in addition, the guide member comprises an annular gasket housed within an axial cavity and adapted to exert a hydraulic tight-fit action against the outer surface of the slidable rod, thus contributing to make the pump substantially waterproof. The gasket is preferably housed in an annular cavity or groove. Said groove is preferably radially open towards the inside of the cavity of the guide member and longitudinally open outside the guide member and therefore has a substantially "L"-shaped cross-section. The gasket is also preferably held in position within the groove by a locking cap, which is axially fitted on the guide member and prevents the gasket from slipping out of said groove.

According to a preferred embodiment of the invention, the guide member is surrounded by said engaging ferrule for the open base of a syringe for drug infusion, whereby, when the syringe is engaged in the ferrule and the guide member is made so as to extend outside the casing, the guide member extends over a portion of the length of the hollow body of the syringe.

Advantageously, according to a preferred embodiment of the invention, the longitudinally slidable hollow rod comprises a distal portion or pusher integrated in the rod, said pusher being provided with an annular portion extending radially towards the outside of the rod, and a longitudinal portion extending axially from said annular portion. Said pusher is apt to be received in a seat provided in the sliding plunger which causes exit of the drug from the syringe.

Preferably, said seat provided in the plunger receives the pusher with some interference, in order to prevent occurrence of the so-called free-flow phenomenon, i.e. the exit of the drug from the syringe also in the absence of infusion by the pump, because of the difference in hydrostatic pressure due to the position in which the pump may be arranged relative to the patient's body associated with the pump.

In other embodiments, a pusher separated from the slidable rod and fixed to the rod by known means, for example glue or mortise, may be provided.

Advantageously, according to a preferred embodiment of the invention, the casing, the engaging ferrule for the syringe, the guide member, the slidable rod and the pusher are entirely made of plastics, for example of the same plastic material and by means of the injection molding technique. Thanks to the wide use of plastics in the making of the pump components, a remarkable reduction in weight is thus obtained and this contributes to make transport of the pump by the user easier.

Still according to a preferred embodiment of the invention, the electromechanical unit is supported by a support structure firmly but detachably associated within the casing of the pump, preferably in a position distal to said guide member.

Preferably, said support structure is made of metal and preferably comprises a base plate and a frame. Mainly the pinion and the toothed gear wheel are arranged between the base plate and the frame. In addition, on the base plate, at the center of the toothed gear wheel, there is provided a pressure transducer capable of generating an electric signal proportional to the thrust exerted thereon by a conical tip secured to the base of the screw. The signal generated by the transducer can be advantageously processed by an electronic control unit provided aboard the pump, in order to measure the effort exerted by the geared motor when actuating the sliding rod and, consequently, the resistance encountered upon infusion of the drug into the patient's body. Said electronic control unit can therefore, on the basis of said signal, stop operation of the pump in order to prevent for example conditions of drug bolus, i.e. excessive amounts of drug per time unit, which conditions may occur as a consequence of an occlusion, when said occlusion is removed.

The base plate is preferably substantially flat and rests against a plurality of rest elements extending longitudinally within the chamber of the casing of the pump. The frame is preferably shaped in such a way as to define, between said frame and the plate with which the frame is associated, a chamber suitable for receiving the pinion and the toothed gear wheel. On the frame, on the side opposite to the plate, there are also preferably secured the electric geared motor and the contacts for a battery powering said electric geared motor. The battery is accessible through a door provided on the adjacent flank of the casing of the pump. Plate and frame preferably form a rigid support structure and are held together for example by screws.

BRIEF DESCRIPTION OF THE DRAWINGS

Some preferred embodiments of the invention will be described below by way of non-limiting example with reference to the annexed drawings, in which.

In all the figures, the same reference numerals have been used to indicate same or functionally equivalent elements.

DESCRIPTION OF SOME PREFERRED EMBODIMENTS

Figure 1A:
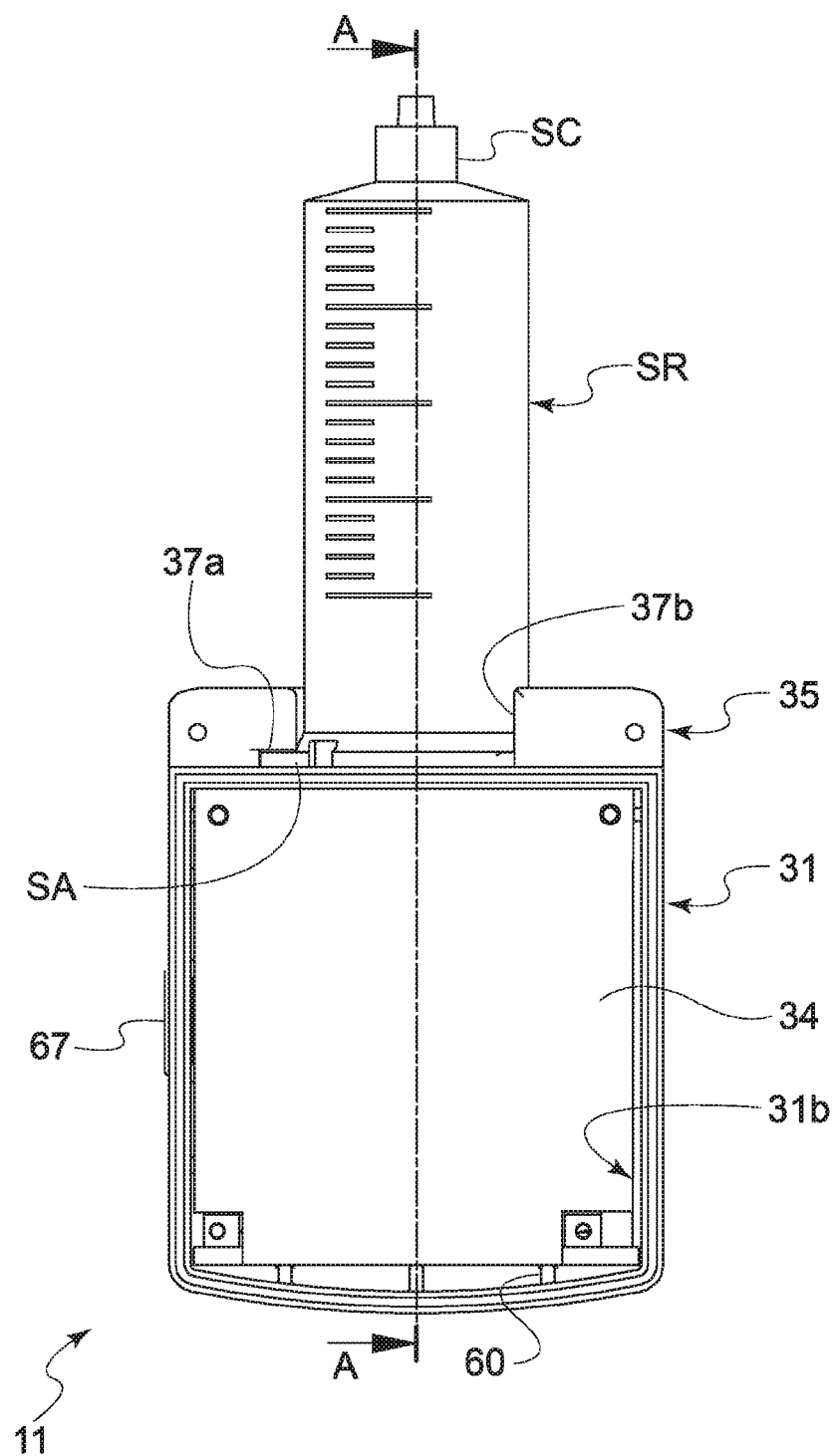
FIGS. 1A and 1B are plan views of a pump according to a preferred embodiment of the invention, with and without electronic board, respectively.
Figure 1B:
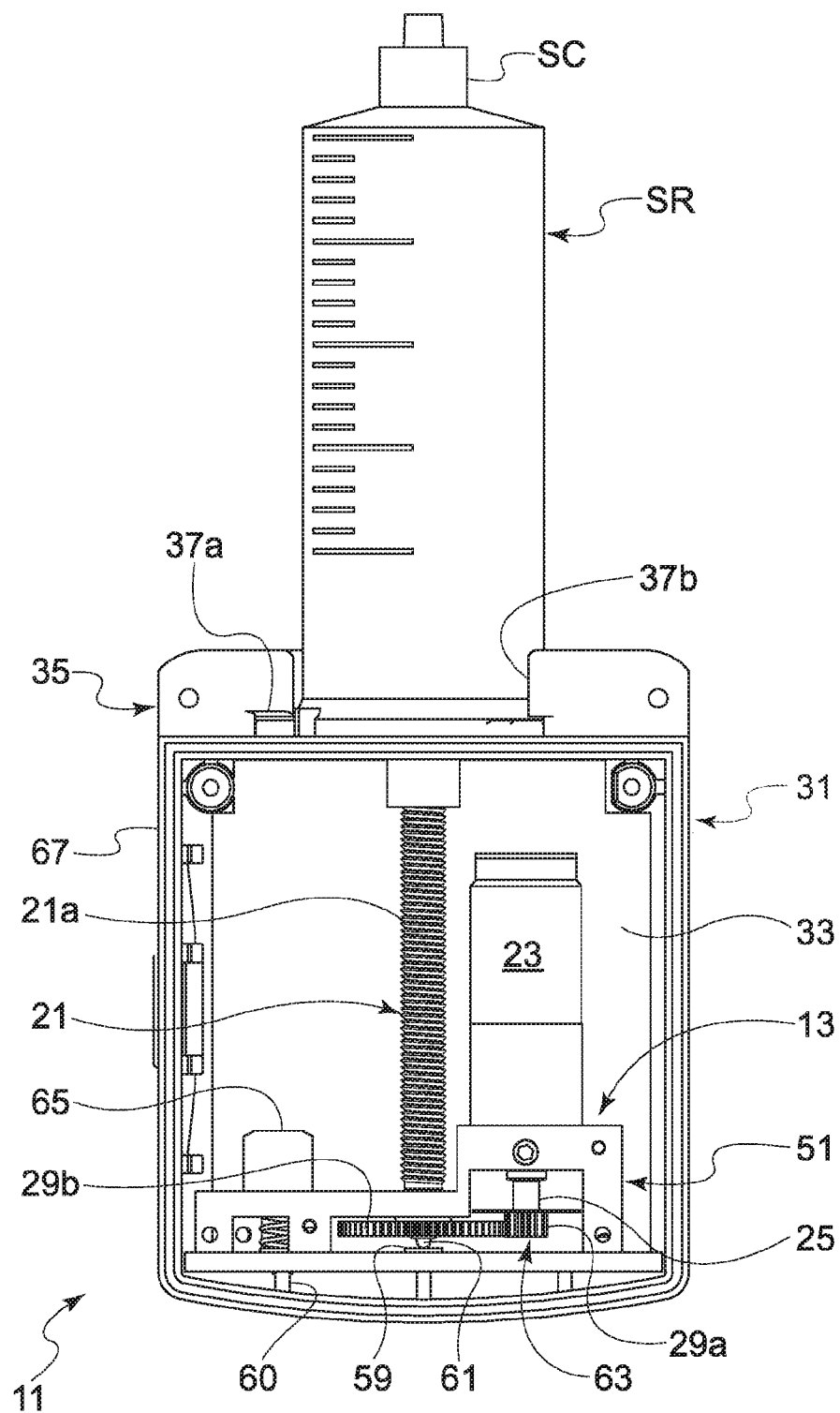
Figure 2:
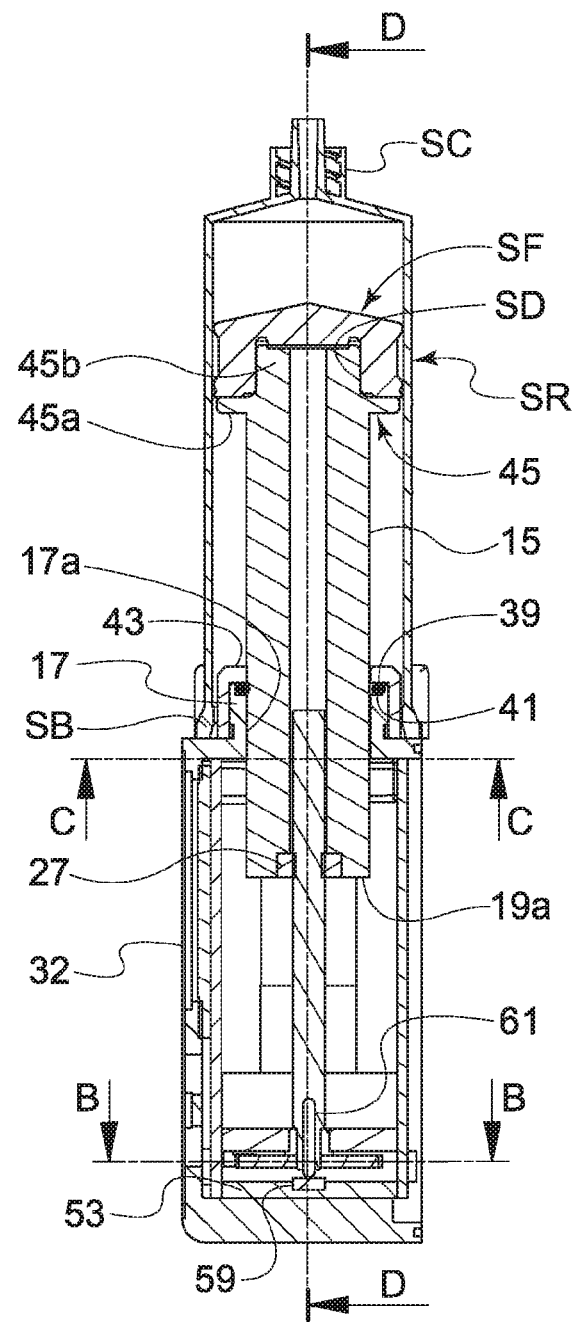
FIG. 2 is a section taken along a plane A-A of FIG. 1A.
Figure 3:
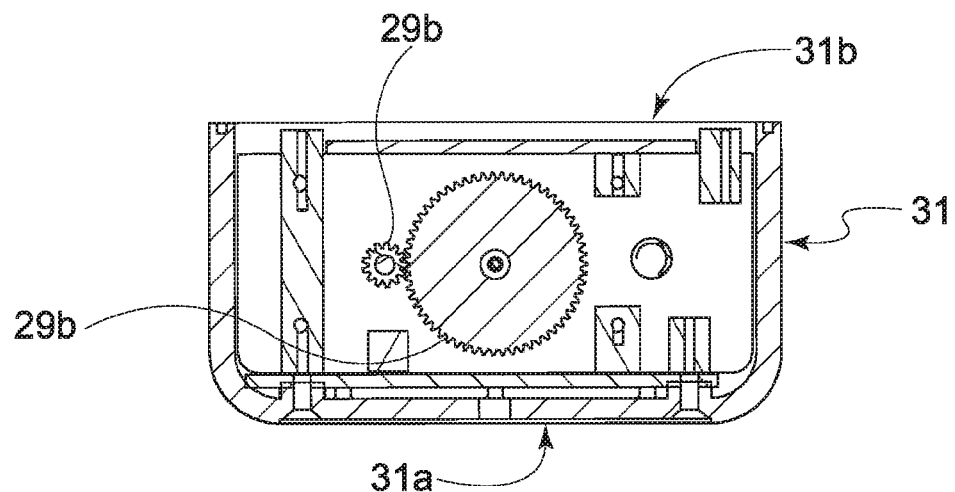
FIG. 3 is a section taken along a plane B-B of FIG. 2.
Figure 4:
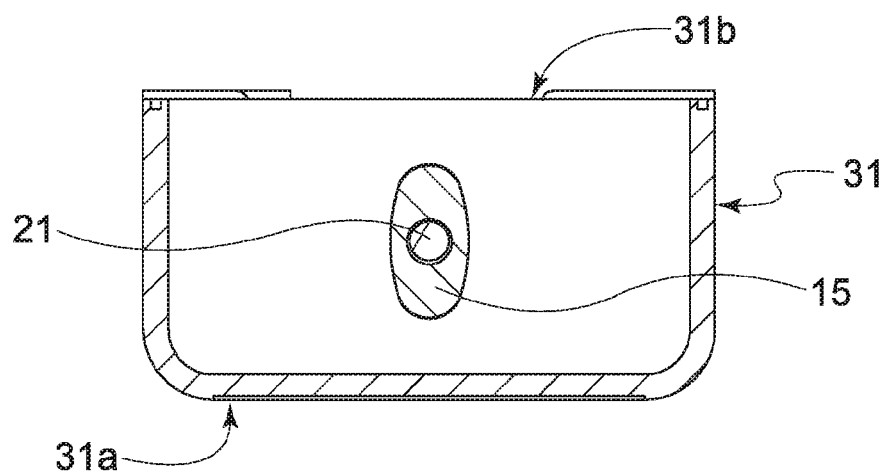
FIG. 4 is a section taken along a plane C-C of FIG. 2.
Figure 5:
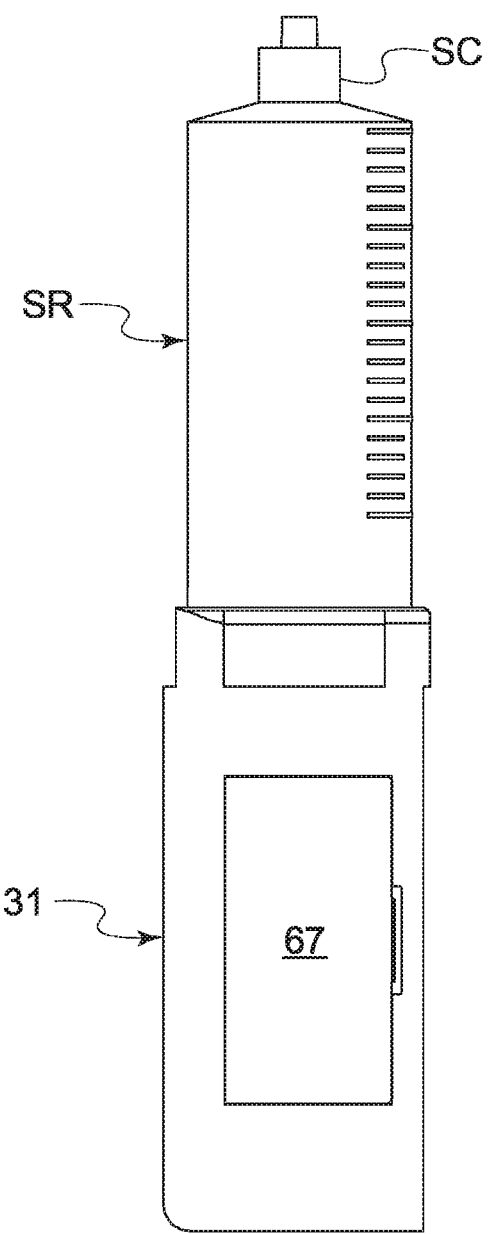
FIG. 5 is a side view of the pump of FIG. 1A.

Referring to the annexed figures, the portable pump for drug infusion according to the invention has been indicated as a whole with reference numeral 11.

The pump 11 made according to a preferred embodiment of the invention mainly comprises an electromechanical unit 13, or drive unit, to cause exit of a drug from a syringe SR removably engaged in the pump 11. The electromechanical unit 13 of the pump 11 has a rod 15 longitudinally slidable within a guide member 17. The rod 15 of the drive unit 13 is capable of exerting an axial thrust onto the plunger SF of the syringe SR engaged in the pump 11.

Advantageously, according to the invention, in order to prevent the rod 15 from rotating about its longitudinal axis, relative to the guide member 17, during longitudinal sliding, the rod 15 and the guide member 17 both have a non-circular cross-section.

In the shown embodiment, the cross-sections of the rod 15 and the guide member 17 are complementary to each other and, still referring to the shown embodiment, a minimum clearance is defined between the rod 15 and the guide member 17, such as to allow axial sliding of the rod 15 within the guide member 17, substantially without jamming, but also to prevent oscillations of the rod 15 relative to the guide member 17 during longitudinal advancement of the rod 15.

Still referring to the illustrated embodiment, the cross-section of the rod 15 and of the guide member 17 is an oval or elliptical cross-section. In other embodiments, other geometrical shapes, preferably comprising at least one curved portion and at least one rectilinear portion, such as, for example, "C"-like or "D"-like shapes may be envisaged.

The rod 15 is hollow inside and comprises an axial cavity 19, provided with at least one open base 19a. Advantageously, the rod 15 is therefore adapted to receive a screw 21 rotatable about its longitudinal axis and driven by an electric geared motor 23 belonging to said electromechanical unit 13.

The rotatable screw 21 with its thread 21a is engaged in an internally threaded nut or bushing 27. In the illustrated embodiment, the nut 27 is housed within said cavity 19, at said open base 19a, and is co-molded with or press-fitted in the open base 19a of the longitudinally slidable hollow rod 15.

Figure 8A:
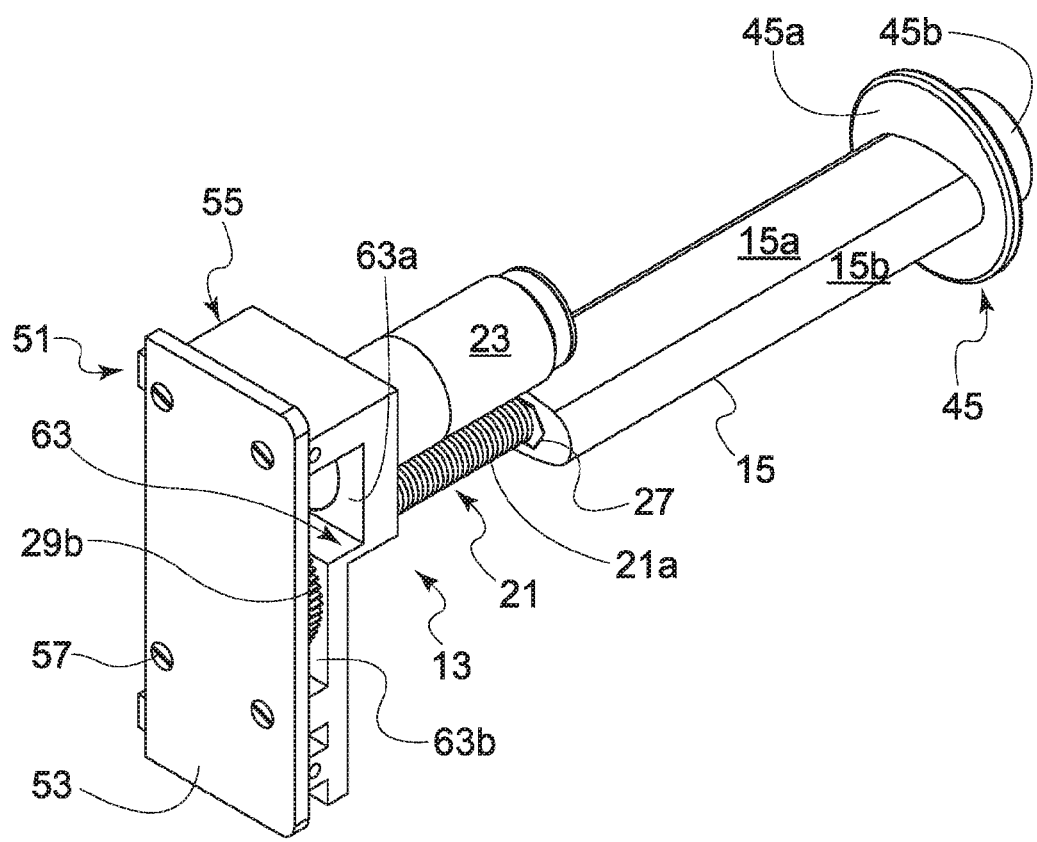
FIGS. 8A-8C are perspective views of the electromechanical unit.
Figure 8B:
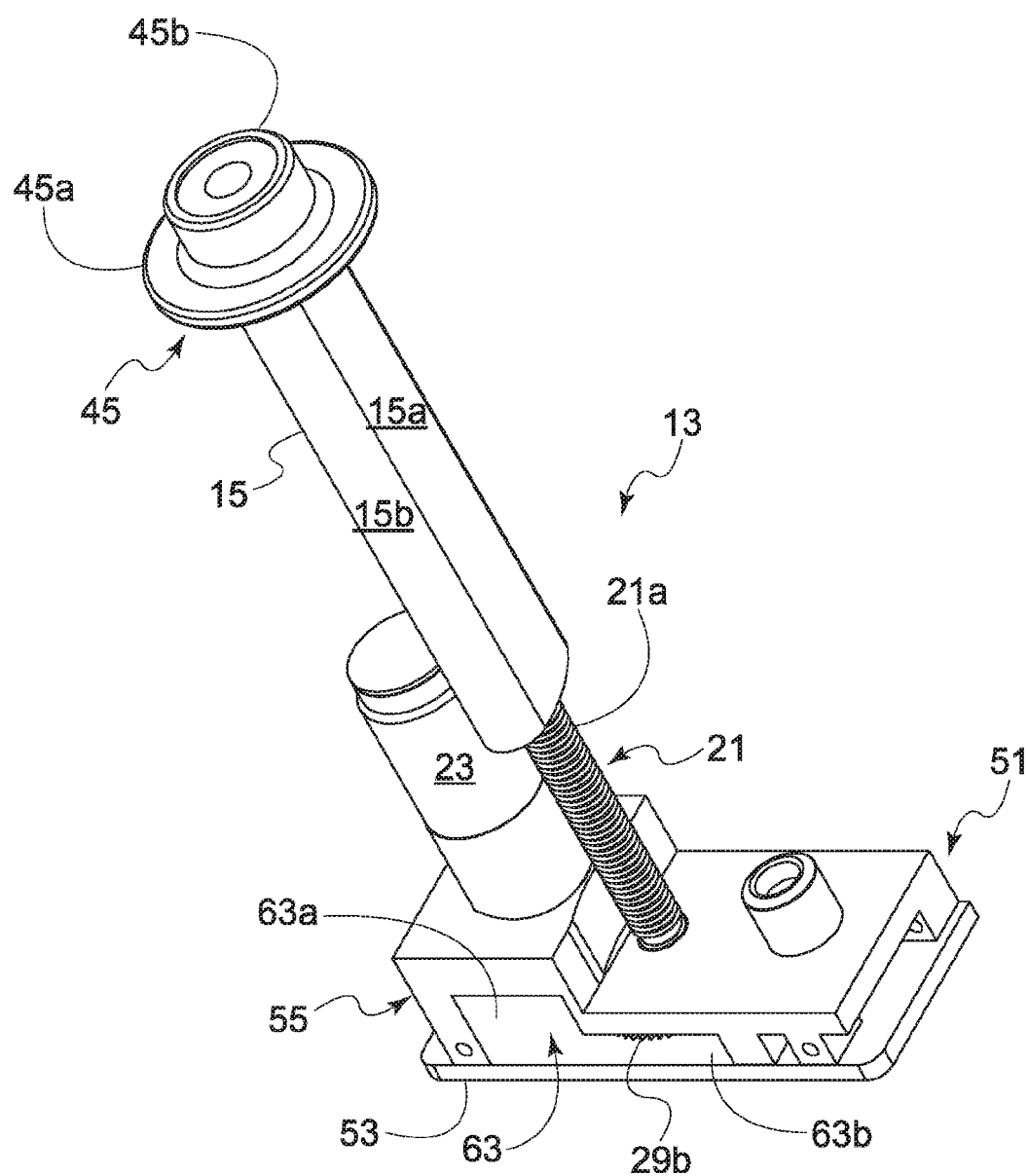
Figure 8C:
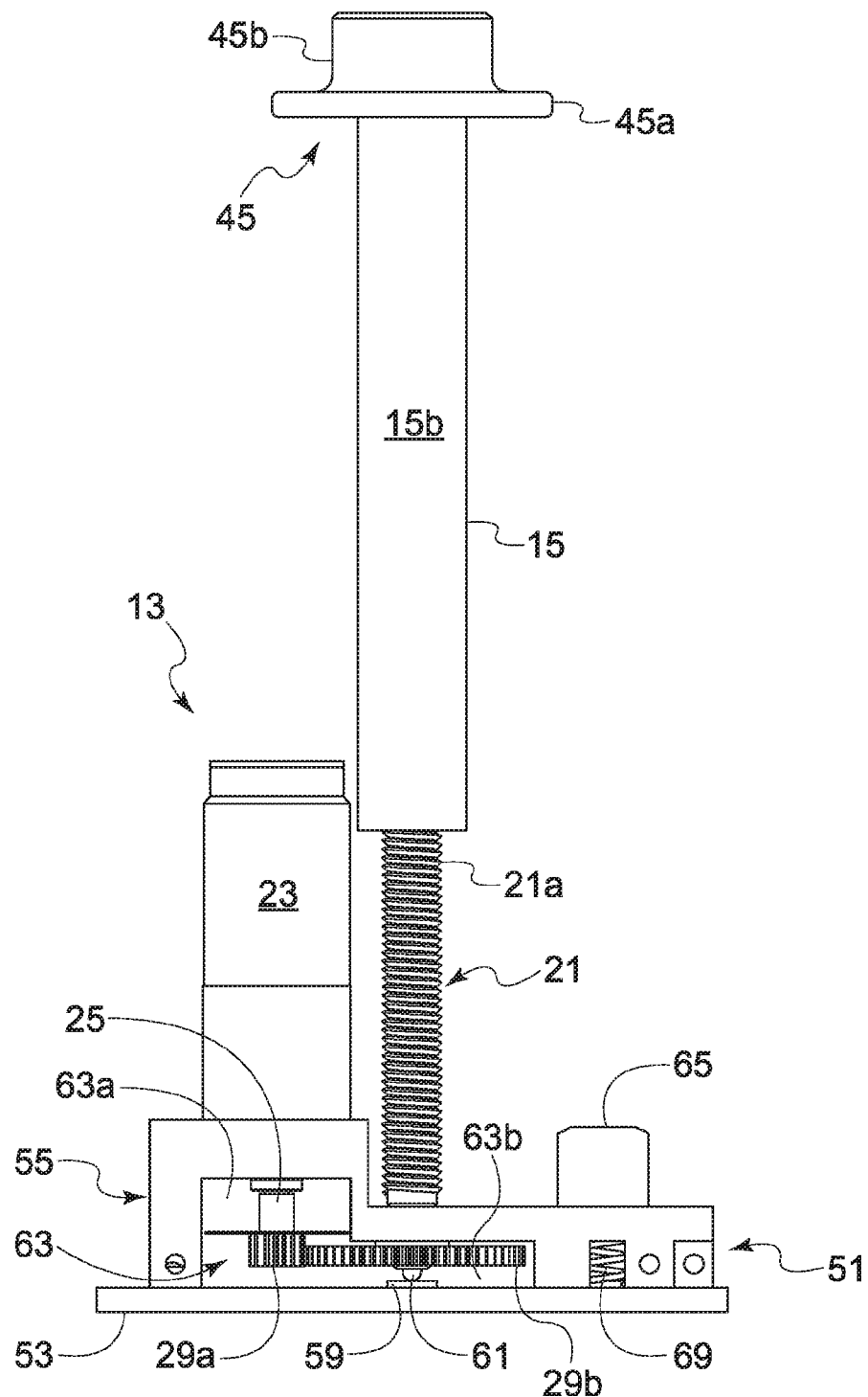

Referring in particular to FIGS. 8A-8C, the electromechanical or drive unit 13 further comprises the electric geared motor 23, having a driving shaft 25 provided, in turn, with a pinion 29a engaging with its teeth in a toothed gear wheel 29b fixed to the base of said rotatable screw 21. The electric geared motor 23 is adapted to cause, by means of the coupling between the pinion 29a and the toothed gear wheel 29b, the rotation, preferably in both directions depending on the direction of rotation of the geared motor 23, of the screw 21 and consequent sliding back and forth of the hollow rod 15.

The pump 11 according to the invention further comprises, in the preferred illustrated embodiment, a casing 31 defining therein a chamber 33 housing the electromechanical unit 13. Still according to the invention, the casing 31 is preferably made of a plastic material, for example by injection molding, and said guide member 17 is molded during forming of said casing 31 and thus forms a single piece with said casing 31. Even more preferably, the casing 31 is entirely made of plastics.

Still referring to the illustrated embodiment, the casing 31 has a substantially rectangular annular development, which surrounds the chamber 33. In addition, at least one of the opposite bases of the casing 31 is open in order to allow access to the chamber 33 housing the electromechanical unit 13. In the shown embodiment, both the opposite bases of the casing 31 are open. A first base 31a houses a display 32 and a second base 31b houses a printed circuit board 34.

Still according to a preferred embodiment of the invention, said casing 31 further comprises outside a ferrule 35 capable of receiving, in a configuration of firm engagement, the base SB of a syringe SR for drug infusion. Preferably, said ferrule 35 defines a corresponding bayonet-like coupling for a syringe SR having radially extending and diametrically opposite wings SA. The ferrule 35 includes a pair of opposite arched seats 37a and a pair of diametrically opposite slits 37b, whereby the syringe SR can be engaged into the pump 11 by a coupling movement substantially comprising an axial approaching movement and a subsequent rotation of the syringe SR about its longitudinal axis. In other embodiments, the ferrule 35 may define other types of coupling for the base of a syringe of a different type, for example provided with a screw coupling of complementary coupling provided inside or outside the syringe body.

Figure 6:
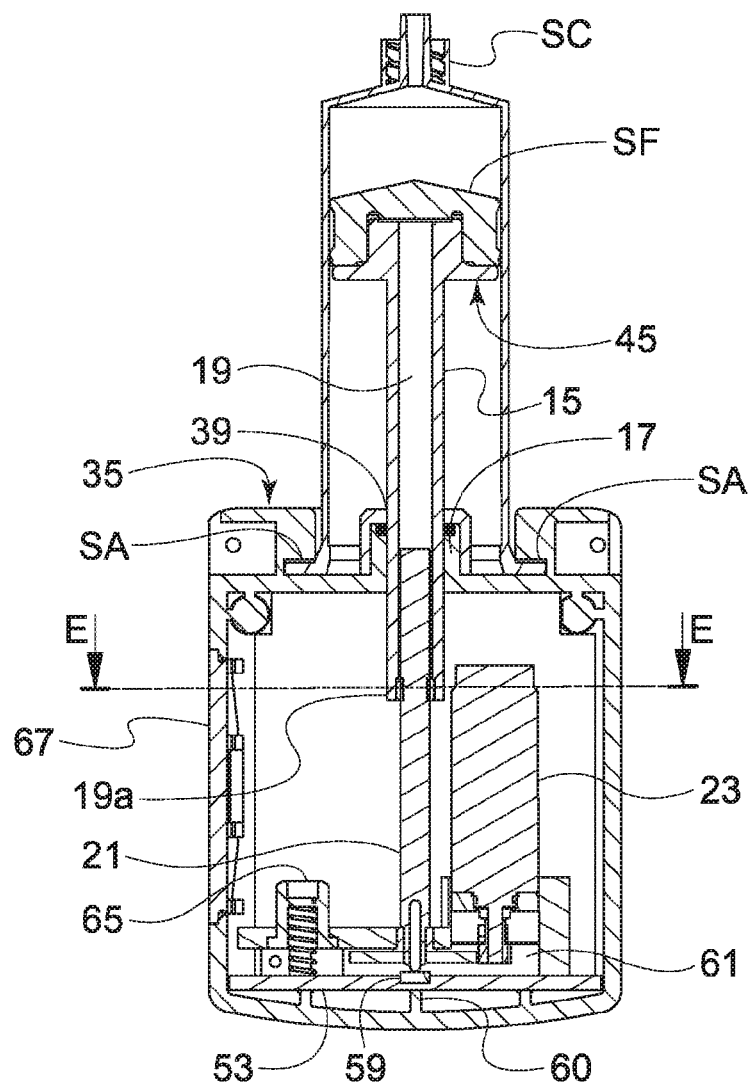
FIG. 6 is a section taken along a plane D-D of FIG. 2.
Figure 7:
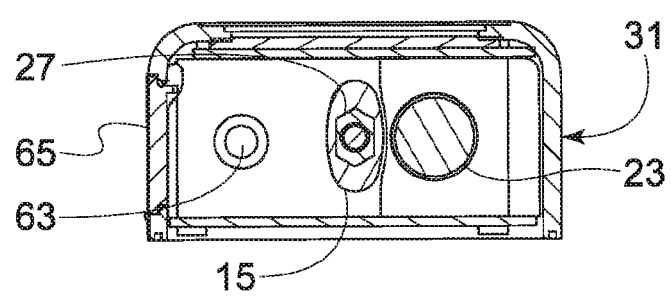
FIG. 7 is a section taken along a plane E-E of FIG. 6.

In the shown embodiment, as can be better appreciated in FIG. 6, the guide member 17 extends longitudinally outside the casing 31 of the pump 11. In other embodiments, however, it can also be envisaged that the guide member extends inside the casing 31 or both inside and outside said casing 31.

Preferably, in addition, the guide member 17 comprises an annular gasket 39 housed in an annular cavity or groove 41 and adapted to exert a hydraulic tight-fit action against the outer surface of the slidable rod 15, thus contributing to make the pump substantially waterproof. In the illustrated embodiment, the annular groove 41 is both radially open towards the inside of the cavity 17a of the guide member 17 and longitudinally open outside the guide member 17 and is preferably held in position by a locking cap 43, which is axially fitted on the guide member 17. Advantageously, the locking cap 43 prevents the annular gasket from axially slipping out of said annular cavity 41.

Still referring to the illustrated embodiment, the guide member 17 is surrounded by said engaging ferrule 35 for the open base SB of a syringe SR for drug infusion, whereby, when the syringe SR is engaged in the ferrule 35 and the guide member 17 is made so as to extend outside the casing 31, the guide member 17 extends over a portion of the length of the hollow body of the syringe SR.

The longitudinally slidable hollow rod 15 comprises a distal portion 45 or pusher provided with an annular portion 45*a* extending radially towards the outside of the rod 15, and a longitudinal portion 45*b* extending axially from said annular portion 45*a*. Said pusher 45 is apt to be received in a seat SD provided in the sliding plunger SF which causes exit of the drug from the syringe SR through the front end SC.

The seat SD provided in the plunger SF receives the pusher 45 preferably with some interference, in order to prevent occurrence of the so-called free-flow phenomenon, i.e. the exit of the drug from the syringe SR also in the absence of infusion by the pump 11, because of the difference in hydrostatic pressure due to the position in which the pump 11 may be arranged relative to the patient's body associated with the pump 11 through a dropper or cannula.

In the illustrated embodiment, the electromechanical unit 13 is supported by a support structure 51 firmly but detachably associated within the casing 31 of the pump 11. The support structure 51 is housed in the chamber 33 in a position distal to said guide member 17.

Preferably, said support structure 51 is made of metal, for example aluminum, and comprises a base plate 53 and a frame 55 attached to the plate 53 by means of screws 57. Mainly the pinion 29*a* and the toothed gear wheel 29*b* are arranged between the base plate 53 and the frame 55. In addition, on the base plate 53, at the center of the toothed gear wheel 29*b*, there is provided a pressure transducer 59 capable of generating an electric signal proportional to the thrust exerted thereon by a conical tip 61 secured to the base of the screw 21.

The base plate 53 is preferably substantially flat and rests against a plurality of rest elements 60 extending longitudinally and transversely within the chamber 33 of the casing 31 of the pump 11. The frame 55 is preferably shaped in such a way as to define, between said frame 55 and the plate 53 with which the frame 55 is associated, a chamber 63 suitable for receiving the pinion 29*a* and the toothed gear wheel 29*b*. On the frame 55, there are also preferably secured the electric geared motor 23 and the contacts 65, supported by an elastic member consisting, for example, of a helical spring 69, for a battery (not shown) powering said electric geared motor 23. The battery is accessible through a door 67 provided on the adjacent flanks of the casing 31 of the pump 11. Plate and frame preferably form a rigid support structure and are held together for example by screws.

Still referring in particular to FIGS. 8A-8C, advantageously, according to the invention, the support structure 51 comprises a frame 55 made as a single piece of aluminum and defining said chamber 63 between said frame 55 and said plate 53, the plate 53, too, being preferably made of aluminum. The frame 55 is advantageously shaped in such a way as to define a first chamber portion 63*a* and a second chamber portion 63*b*, wherein the distance from the plate 53 is greater for the portion 63*a* than for the portion 63*b*. Thanks to this configuration of the frame 55, the support structure 51 mainly comprises only two parts held together by screws 57. The support structure is therefore particularly rigid and lightweight and allows to provide a pinion 29*a* housed in the chamber portion 63*a* and having a width greater than the width of the toothed gear wheel 29*b* housed in the chamber portion 63*b*, for a better kinematic engagement between said pinion and toothed gear wheel. In the illustrated embodiment, the geared motor 23 is advantageously secured to the frame 55 on the side opposite to the chamber portion 63*a*. The axis of rotation of the driving shaft 25 is also parallel to the axis of rotation of the screw 21 and the geared motor 23 can be arranged in a position close to the screw 21 and the rod 15. The rod 15, having a non-circular cross-section, is indeed preferably and advantageously oriented in such a manner as to minimize the distance between said rod 15 and the geared motor 23, without any interference between said rod 15 and the geared motor 23 during the entire longitudinal sliding of the rod 15. In the embodiment shown in FIGS. 8A-8C, the rod 15 has a cross-section comprising a substantially rectangular central portion 15*a* and a pair of rounded peripheral portions 15*b*. Even more preferably, the transverse axis having a length greater than the cross-section of the rod 15 is perpendicular to a plane passing through the center of the geared motor 23 and through the center of the rod 15. Still referring to this embodiment, the inner cavity 19 of the guide member 15 advantageously and preferably has a complementary cross-section.

The invention as described and illustrated is susceptible to several variations and modifications, all of which fall within the same inventive principle.

The invention claimed is:

1. A portable pump (11) for drug infusion through a syringe (SR) removably engaged in the portable pump, wherein said syringe is provided with a hollow body, said hollow body having an open rear base (SB) for engagement of said syringe to the portable pump and an open front end (SC) for exit of a drug, wherein said syringe is provided with a slidable plunger for causing the exit of the drug from the syringe through said open front end (SC) of said hollow body, wherein said portable pump comprises a casing of plastic material defining therein a chamber (33) housing an electromechanical unit (13), wherein said casing comprises externally a ferrule capable of receiving, in configuration of firm engagement, said open rear base (SB) of said syringe (SR) for drug infusion, wherein said ferrule defines a coupling for the open rear base of said syringe, said open rear base being provided with a complementary coupling inside or outside of the hollow body of said syringe, wherein said syringe firmly engages to the ferrule of said portable pump externally of said casing;

wherein said casing comprises a guide member (17) which forms a single body with said casing and which extends outside said casing of the portable pump and said electromechanical unit having a rod (15) which is longitudinally slidable within the guide member (17) and capable of exerting an axial thrust onto the slidable plunger (SF) of the syringe engaged to the portable pump, characterized in that said rod (15) and said guide member (17) have a complementary non-circular cross-section, whereby rotation of the rod (15) relative to the guide member (17) is prevented; and wherein said guide member (17) extends longitudinally outside the casing (31) and comprises an annular gasket (39) adapted to exert a hydraulic tight-fit action against the rod (15).

2. The portable pump according to claim 1, wherein said complementary non-circular cross-section is an oval or elliptical cross-section or wherein said complementary non-circular cross-section is a cross-section comprising at least one curved portion and at least one rectilinear portion.

3. The portable pump according to claim 2, wherein said rod (15) comprises an axial cavity (19) having at least one open base (19a) and adapted to receive a rotatable screw (21) actuated by an electric geared motor (23) belonging to said electromechanical unit (13) and the rotatable screw (21) being engaged in an internally threaded nut or bushing (27) housed within said axial cavity (19) of the rod (15) at said at least one open base (19a).

4. The portable pump according to claim 2, wherein said guide member (17) is surrounded by the ferrule (35) for the open rear base (SB) of the syringe (SR) for drug infusion engaged in said portable pump, whereby, when the syringe (SR) is engaged in the ferrule (35), the guide member extends over a portion of the hollow body of the syringe (SR).

5. The portable pump according to claim 2, wherein the rod (15) comprises an end portion or pusher (45) provided with an annular portion (45a) extending radially outward from the rod (15) and with a longitudinal portion (45b) axially extending from said annular portion (45a).

6. The portable pump according to claim 1, wherein said rod (15) comprises an axial cavity (19) having at least one open base (19a) and adapted to receive a rotatable screw (21) actuated by an electric geared motor (23) belonging to said electromechanical unit (13), said rotatable screw being engaged in an internally threaded nut or bushing (27) housed within said axial cavity (19) of the rod (15) at said at least one open base (19a).

7. The portable pump according to claim 6, wherein said electric geared motor (23) has a driving shaft (25) provided with a pinion (29a) which engages into a toothed gear wheel (29b) fixed to a base of said rotatable screw (21), said electric geared motor being adapted to cause, through coupling between the pinion and the toothed gear wheel, rotation of the rotatable screw (21) in both directions and consequent sliding back and forth of the rod (15), and wherein said complementary non-circular cross-section is an elliptical cross-section having a semi-major and a semi-minor axis and wherein said rod (15) having complementary non-circular cross-section is oriented with said semi-minor axis towards said electric geared motor (23), without any interference between said rod (15) and the electric geared motor (23).

8. The portable pump according to claim 6, wherein said guide member (17) is surrounded by the ferrule (35) for the open rear base (SB) of the syringe (SR) for drug infusion engaged in said portable pump, whereby, when the syringe (SR) is engaged in the ferrule (35), the guide member extends over a portion of the hollow body of the syringe (SR).

9. (prevously presented): The portable pump according to claim 6, wherein the rod (15) comprises an end portion or pusher (45) provided with an annular portion (45a) extending radially outward from the rod (15) and with a longitudinal portion (45b) axially extending from said annular portion (45a).

10. The portable pump according to claim 1, wherein said annular gasket (39) is housed in an annular cavity (41) of the guide member radially open towards the rod (15) and longitudinally open outside the guide member (17), and wherein said guide member (17) further comprises a locking cap (43) preventing the annular gasket (39) from slipping out of said annular cavity (41).

11. The portable pump according to claim 1, wherein said guide member (17) is surrounded by the ferrule (35) for the open rear base (SB) of the syringe (SR) for drug infusion engaged in said portable pump, whereby, when the syringe (SR) is engaged in the ferrule (35), the guide member extends over a portion of a length of the hollow body of the syringe (SR).

12. The portable pump according to claim 1, wherein the rod (15) comprises an end portion or pusher (45) provided with an annular portion (45a) extending radially outward from the rod (15) and with a longitudinal portion (45b) axially extending from said annular portion (45a).

13. The portable pump according to claim 1, wherein said electromechanical unit (13) is supported by a support structure (51) made of metal and comprising a base plate (53) and a frame (55) attached to the base plate (53).

14. The portable pump according to claim 1, wherein said electromechanical unit (13) comprises an electric geared motor (23) actuating a rotatable screw (21) belonging to said electromechanical unit (13) wherein said rotatable screw has at one end a base, said electric geared motor having a driving shaft (25) provided with a pinion (29a) which engages into a toothed gear wheel (29b) fixed to said base of said rotatable screw (21), said electric geared motor being adapted to cause, through coupling between the pinion and the toothed gear wheel, rotation of the rotatable screw (21) in both directions and consequent sliding back and forth of the rod (15), and wherein said complementary non-circular cross-section is an elliptical cross-section having a semi-major and a semi-minor axis and wherein said rod (15) having complementary non-circular cross-section is oriented with said semi-minor axis towards said electric geared motor (23), without any interference between said rod (15) and the electric geared motor (23).

* * * * *